United States Patent
Ooi et al.

(10) Patent No.: US 7,885,545 B2
(45) Date of Patent: Feb. 8, 2011

(54) DISPERSION COMPENSATION METHOD AND COMPENSATION NODE

(75) Inventors: Hiroki Ooi, Kawasaki (JP); Akira Miura, Kawasaki (JP); Kentaro Nakamura, Kawasaki (JP); George Ishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 866 days.

(21) Appl. No.: 10/971,735

(22) Filed: Oct. 25, 2004

(65) Prior Publication Data
US 2005/0226629 A1    Oct. 13, 2005

(30) Foreign Application Priority Data
Mar. 31, 2004    (JP) .............................. 2004-105976

(51) Int. Cl.
H04J 14/02    (2006.01)
H04B 10/12    (2006.01)

(52) U.S. Cl. ........................................ 398/81; 398/147

(58) Field of Classification Search ................ 398/147, 398/148, 149, 150, 159, 194, 81
See application file for complete search history.

(56) References Cited

U.S. PATENT DOCUMENTS

| | | | |
|---|---|---|---|
| 5,629,795 A * | 5/1997 | Suzuki et al. ................ 359/337 |
| 5,717,510 A | 2/1998 | Ishikawa et al. |
| 5,754,322 A | 5/1998 | Ishikawa et al. |
| 5,760,937 A | 6/1998 | Ishikawa et al. |
| 5,815,294 A | 9/1998 | Ishikawa et al. |
| 5,870,213 A | 2/1999 | Ishikawa et al. |
| 5,896,217 A | 4/1999 | Ishikawa et al. |
| 5,909,297 A | 6/1999 | Ishikawa et al. |
| 5,991,477 A | 11/1999 | Ishikawa et al. |
| 6,081,360 A | 6/2000 | Ishikawa et al. |
| 6,320,687 B1 | 11/2001 | Ishikawa et al. |
| 6,411,416 B1 | 6/2002 | Ooi et al. |
| 6,433,923 B2 | 8/2002 | Tanaka et al. |
| 6,501,580 B1 | 12/2002 | Ishikawa et al. |
| 6,574,038 B2 | 6/2003 | Tanaka et al. |
| 6,661,974 B1 | 12/2003 | Akiyama et al. |

(Continued)

FOREIGN PATENT DOCUMENTS

JP    8-321805    12/1996

(Continued)

OTHER PUBLICATIONS

Sebastion Bigo, "Design of NX40 Gbit/s multi-terabit/s transmission systems assisted by simple analytical toots", *International Meeting OA-2003*, Paper No. WA3, Jul. 2003, pp. 220-222.

(Continued)

*Primary Examiner*—Nathan M Curs
(74) *Attorney, Agent, or Firm*—Staas & Halsey LLP

(57) ABSTRACT

A dispersion compensation method comprising the steps of: a) providing a compensation node for each predetermined number of in-line repeaters; b) carrying out dispersion compensation for the in-line repeaters with the different bit rates in common; c) carrying out wavelength demultiplexing on the optical signal for each of the different bit rates in the compensation node; and d) setting an optimum dispersion compensation amount for the optical signal of each bit rate.

8 Claims, 18 Drawing Sheets

U.S. PATENT DOCUMENTS

| | | |
|---|---|---|
| 6,915,040 B2 * | 7/2005 | Willner et al. ............ 385/37 |
| 2001/0046077 A1 * | 11/2001 | Akiyama et al. ........... 359/161 |
| 2002/0003646 A1 | 1/2002 | Ishikawa et al. |
| 2002/0012162 A1 | 1/2002 | Tanaka et al. |
| 2002/0015207 A1 | 2/2002 | Ooi et al. |
| 2002/0105719 A1 | 8/2002 | Tanaka et al. |
| 2004/0037499 A1 | 2/2004 | Okuno |
| 2004/0047636 A1 | 3/2004 | Guild et al. |

FOREIGN PATENT DOCUMENTS

| | | |
|---|---|---|
| JP | 11-68657 | 3/1999 |
| JP | 11-88260 | 3/1999 |
| JP | 11-88261 | 3/1999 |
| JP | 11-331074 | 11/1999 |
| JP | 2000-236299 | 8/2000 |
| JP | 2001-339345 | 12/2001 |
| JP | 2002-57622 | 2/2002 |
| JP | 2002-77053 | 3/2002 |
| JP | 2003-298516 | 10/2003 |
| JP | 2003-318825 | 11/2003 |
| WO | WO 0186841 A1 * | 11/2001 |
| WO | WO 2004/017542 | 2/2004 |

OTHER PUBLICATIONS

Yann Frignac, Jean-Christophe, "Numerical optimization of pre- and In-line dispersion compensation in dispersion-managed systems at 40 Gbit/s", *International Meeting OFC 2002, Paper No. ThFF5*, Mar. 2002, pp. 612-613.

European Search Report, dated Jun. 29, 2005, for related European Patent Application No. EP 04 02 5763.

* cited by examiner

DCT=0 ps/nm    SMF 100 km × 6 span (NRZ)

DCT=0    DCL=100%    R.D=0

DCT=0    DCL=114%    R.D=0

OADM

OPTICAL CROSS-CONNECT

DISPERSION COMPENSATION METHOD AND COMPENSATION NODE

BACKGROUND OF THE INVENTION

1. Field of the Invention

The present invention relates to a dispersion compensation method and a compensation node apparatus, and, in particular, to a dispersion compensation method and a compensation node apparatus for compensating chromatic dispersion occurring in an optical fiber in a wavelength division multiplexing transmission system.

2. Description of the Related Art

In order to respond to a recent increase in communication network usage, research and development for achieving increase in a transmission capacity and a transmission distance of an optical communication system have been proceeded with. Currently, a wavelength division multiplexing (WDM) optical transmission system has been put into a practical use at a base transmission rate of 10 Gbit/s per channel. Further, a study of an optical transmission system of 40 Gbit/s in a next generation has been proceeded with for the purpose of further cost reduction. Furthermore, recently, a multi-function photonic network is demanded, and, not only a function of point-to-point transmission but also a function of switching an optical signal route freely by means of an optical add/drop multiplexing (OADM) or an optical cross-connect (OXC) is required.

However, for a high-bit-rate optical transmission more than 10 Gbit/s, optical waveform degradation due to a so-called 'chromatic dispersion' in which a propagation speed of light becomes different for each wavelength becomes a serious problem. Further, since a chromatic dispersion tolerance becomes strict in inverse proportion to a square of bit rate of a signal to transmit, the wavelength tolerance for a signal of 10 Gbit/s is approximately 1000 ps/nm, while the wavelength tolerance for a signal of 40 Gbit/s is approximately 70 ps/nm.

Such a strictness in the tolerance of chromatic dispersion requires limitation of a transmission distance in a dispersion fiber (+17 ps/nm/km) to approximately 60 km for 10 Gbit/s, and approximately 4 km for 40 Gbit/s. In order to solve this problem and to achieve long distance transmission, a dispersion compensation fiber (DCF) having opposite-sign dispersion with respect to that of a channel is in transmission fiber applied as shown in FIG. 1 in the related art.

In FIG. 1, a dispersion compensation fiber is disposed in each of a transmitting end (DCT) 10, an in-line repeater (DCL) 11, a receiving end (DCR) 12 and a compensation node (CN) 13. The compensation node 13 is provided, for example, for each six spans, for the purpose of OADM, OXC or gain equalization.

FIG. 2 shows an example of a dispersion map in a condition of a single bit rate (40 Gbit/s), which has been studied in the related art (see Japanese Laid-open Patent Application No. 2003-298516, for example). In this example, a transmission distance is 600 km, which corresponds to a distance between compensation nodes (6 spans) in FIG. 1. A dispersion deviation amount (channel dispersion amount for one span+dispersion amount in the in-line DCF) is defined as $\Delta D_L$. In order to simplify a configuration of a transmitting end, a dispersion compensation amount at transmitter side $D_{DCT}$ is fixed at zero.

FIG. 3A shows Q penalty, which is a degradation amount in a Q value indicating waveform characteristics with respect to a residual dispersion amount (total dispersion amount in the channel+the dispersion compensators) in a case where an in-line dispersion compensation amount $D_{DCL}$=100% (complete compensation from a dispersion amount for one span of the channel) and 114% (over compensation by 14%) for transmission of 600 km with an SMF (conventional single mode fiber) at 40 Gbit/s. As shown in FIGS. 3B and 3C, it is seen that waveform degradation is smaller and thus, the Q penalty is smaller in the case of 114% over compensation as shown in an eye pattern of FIG. 3C than that in the case of 100% compensation as shown in an eye pattern of FIG. 3B. It is noted that in either case of the in-line dispersion compensation amount $D_{DCL}$, the dispersion compensation amount at the receiving end ($D_{DCR}$+VDC) should be set and adjusted shorter so that the residual dispersion should be adjusted to approximately zero.

FIG. 4 shows Q penalty characteristics with respect to a dispersion deviation amount $\Delta D_L$ for each in-line span (distance between the in-line repeaters) in a case where the dispersion compensation amount ($D_{DCR}$) at the receiving end is adjusted to approximately zero so that the residual dispersion may become zero in the SMF 600 km transmission (100 km×6 spans). It is seen therefrom that the penalty becomes smaller as the in-line dispersion compensation residual amount is set minus so that over-compensation is carried out by the in-line repeater DCF. FIG. 5 shows an optimum dispersion map based on this result. In FIG. 5, a compensation coefficient in the in-line compensator is set as 1+β=110% and a compensation coefficient in the last stage is set as being 50%, and thus, a total residual dispersion is adjusted at zero.

Further, a demand has been increased to apply an optical add/drop multiplexing apparatus (OADM) such as that shown in FIG. 6A or an optical cross-connect (OXC) such as that shown in FIG. 6B in a channel. In the OADM currently used, once all the channels of signals are separated by means of a demultiplexer, desired channels of signals are branched off externally, or, after desired channels of signals are inserted, all the channels of signals are multiplexed by means of a multiplexer and are sent to a transmission fiber. Further, a configuration called AOTF employing a wavelength selection switch may also be considered. By disposing dispersion compensators (DCF) at a position A immediately before the demultiplexer and a position B immediately subsequent to the multiplexer as shown in FIG. 6A, dispersion compensation for all the channels can be achieved in a lump by means of one or two dispersion compensators. In contrast thereto, it is not preferable to dispose dispersion compensators at positions C immediately subsequent to the demultiplexer or at positions D immediately before the multiplexer in FIG. 6A since the number of dispersion compensators corresponds to the number of all the channels are required in this case and thus a problem may occur in terms of costs or a size of the entire system. Therefore, at a position E in FIG. 6A at which the demultiplexer and the multiplexer are directly coupled together in the optical add/drop multiplexing apparatus, residual dispersion should be controlled to be less than a dispersion tolerance.

FIG. 7 shows a dispersion map in a case where the OADM is disposed, studied in the related art, in consideration of such points (see Japanese Laid-open Patent Application No. 2003-318825, for example). With respect to an optimum residual dispersion for a maximum transmission distance (for example, 3000 km at 10 Gbit/s), OADM is carried out on a line connecting between the maximum distance point and a zero point (0 km, 0 ps/nm). DCFs are disposed separately at a pre-stage and a post stage of a WDM transmission part (at a DCR and a DCT), and are not disposed at each particular channel which is added or dropped in the OADM. At this time, residual dispersion at the position of the OADM is controlled to lie within a dispersion tolerance. Thereby, the number of DCFs can be minimized, and also, a dispersion compensation disposing manner is common among the respective spans (between a transmission end and the CN, between the CNs, and between the CN and the receiving end). Accordingly, equal transmission characteristics can be obtained for each equal transmission distance.

Other than that, Japanese Laid-open Patent Applications Nos. 2000-236299, 2001-339345, 2002-57622, 2002-77053, 11-68657, 11-88261, 8-321805 and 11-331074, for example, disclose methods for compensating chromatic dispersion in a channel. Further, 'Design of Nx40 Gbit/s multi-terabit/s transmission systems assisted by simple analytic tools' by Sebastien Bigo, International meeting OAA 2003, held on July 2003, Paper No. WA3, pages 220-222, and 'Numerical optimization of pre- and in-line dispersion compensation in dispersion-managed systems at 40 Gbit/s' by Yann Frignac, Jean-christophe Antona, International meeting OFC 2002, held on March 2002, Paper No. ThFF5, pages 612-613 disclose formulas concerning dispersion compensation.

SUMMARY OF THE INVENTION

As a recent demand from communication operators, achievement of a 10G/40G mixed system in which, for an existing 10 Gbit/s WDM system, some wavelengths of 40 Gbit/s signals are added or replaced with is requested. However, no proposal has been made on a practical level for a rule concerning a dispersion compensator disposing manner or optimum change of setting of a dispersion compensation amount (DCT, DCL, DCR, DCC) for a case where a bit rate is increased in such a mixed system.

The present invention has been devised in consideration of the above-mentioned point, and an object of the present invention is to provide a dispersion compensation method and a compensation node apparatus whereby transmission characteristics at different bit rates can be optimized, while a size and costs of an entire system can be minimized.

A first aspect of the present invention includes the steps of:

a) providing a compensation node for each predetermined number of in-line repeaters;

b) carrying out dispersion compensation in common for different bit rates in the in-line repeater;

c) carrying out wavelength demultiplexing on an optical signal for the different bit rates in the compensation node; and d) setting an optimum dispersion compensation amount for the optical signal at each bit rate.

Thereby, transmission characteristics at the different bit rates can be optimized, and a size and costs of the entire system can be minimized.

According to a second aspect of the present invention, the dispersion compensation amount for each in-line repeater between the compensation nodes is set in such a manner that over compensation or under compensation may be carried out with respect to a chromatic dispersion amount between the in-line repeaters.

Thereby, it is possible to suppress waveform degradation occurring due to non-linear effect.

According to a third aspect of the present invention, the dispersion compensation amount is determined for each bit rate or for each one of a transmitting end and the compensation node in a reproduction repeating span, based on a formula having a value different according to the bit rate, with respect to the dispersion compensation amount for the in-line repeaters.

Thereby, it is possible to optimize transmission characteristics for each bit rate.

A fourth aspect of the present invention includes:

a wavelength demultiplexing part carrying out wavelength demultiplexing on the optical signal for respective different bit rates;

a per-bit-rate dispersion compensation part setting an optimum dispersion compensation amount for the optical signal at each bit rate and carrying out dispersion compensation for each bit rate; and a wavelength multiplexing part carrying out wavelength multiplexing of the optical signals each having undergoing the dispersion compensation by means of the per-bit-rate dispersion compensation part.

Thereby, it is possible to optimize transmission characteristics for each of the different bit rates.

A fifth aspect of the present invention includes an optical processing part carrying out optical adding/dropping or optical cross-connect for each of the different bit rates, wherein:

the per-bit-rate dispersion compensation part sets an optimum residual dispersion amount for each bit rate or for a reproduction repeating span in the optical processing part in a value in proportion to the number of repeating spans from a transmission end with respect to a reference value which is an optimum residual dispersion amount for a maximum transmission distance at each bit rate.

Thereby, it is possible to ensure necessary transmission characteristics for the optical added/dropped signal at each bit rate.

In summary, according to the present invention, transmission characteristics at each of different bit rates can be optimized, while a size and costs of an entire transmission system can be minimized.

BRIEF DESCRIPTION OF THE DRAWINGS

Other objects and further features of the present invention will become more apparent from the following detailed description when read in conjunction with the accompanying drawings.

DETAILED DESCRIPTION OF THE PREFERRED EMBODIMENTS

With reference to figures, preferred embodiments of the present invention are described.

From a result of a simulation or a signal transmission experiment, it is seen that a manner of dispersion compensation optimization is different between 10 Gbit/s transmission and 40 Gbit/s transmission as follows:

(a) Difference in optimum residual dispersion

Figure 1:
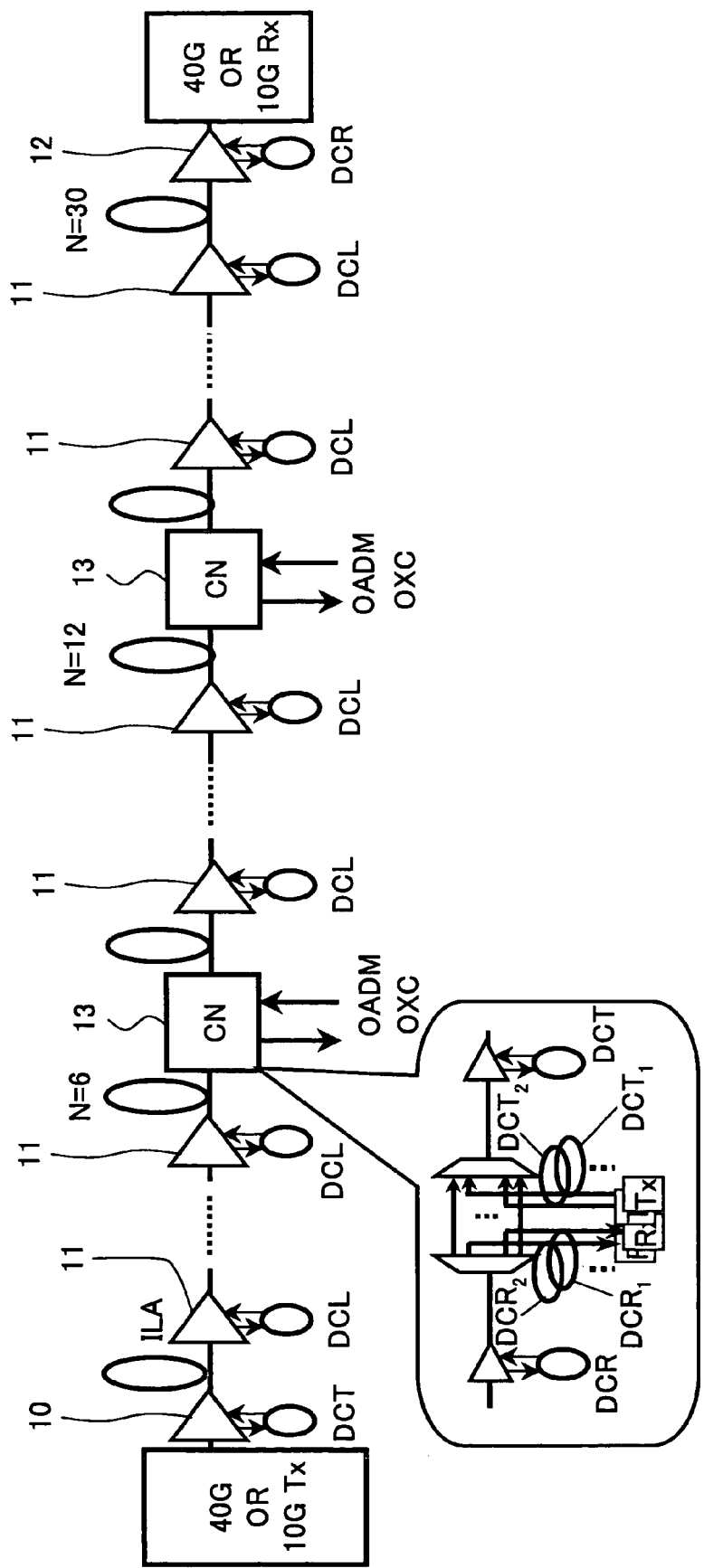
FIG. 1 illustrates a dispersion compensation method in the related art.
Figure 2:
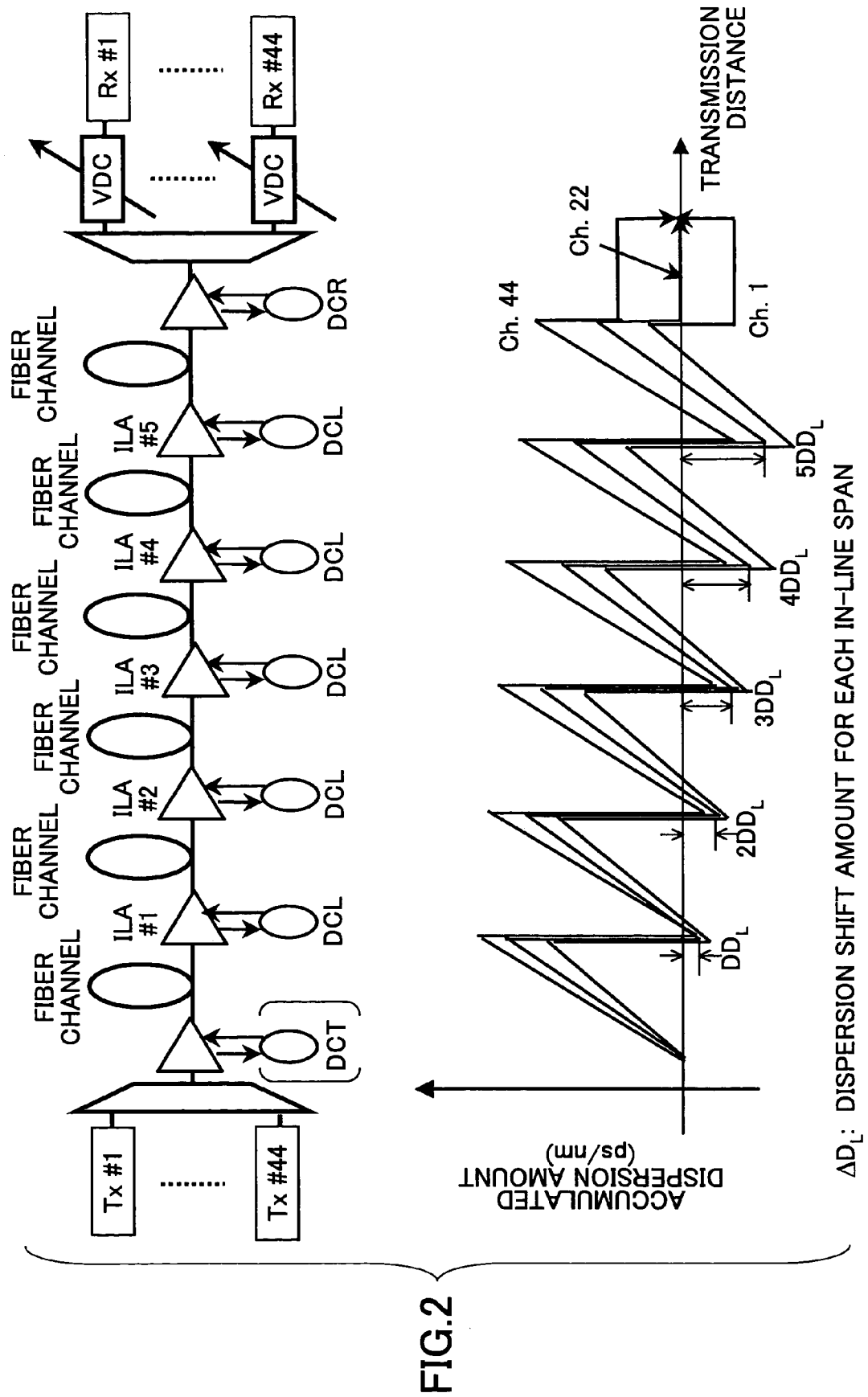
FIG. 2 shows a dispersion compensation map in the related art.
Figure 3A:
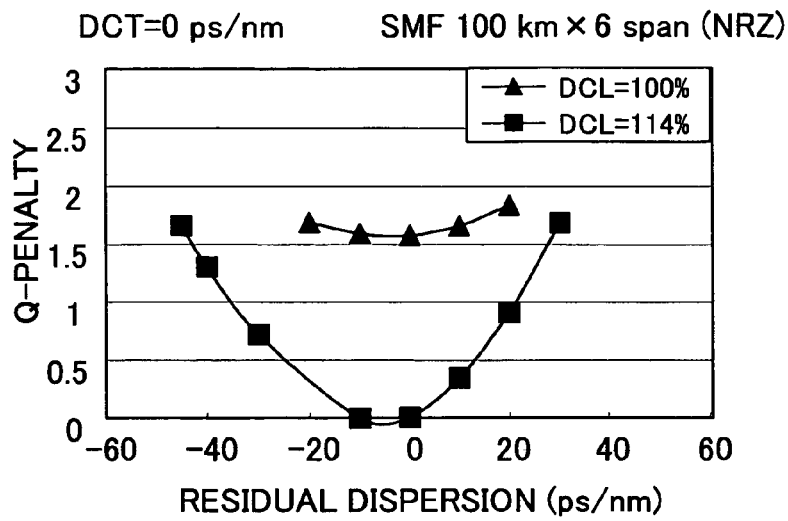
FIGS. 3A through 3C illustrate in-line complete compensation and over-compensation.
Figure 8:
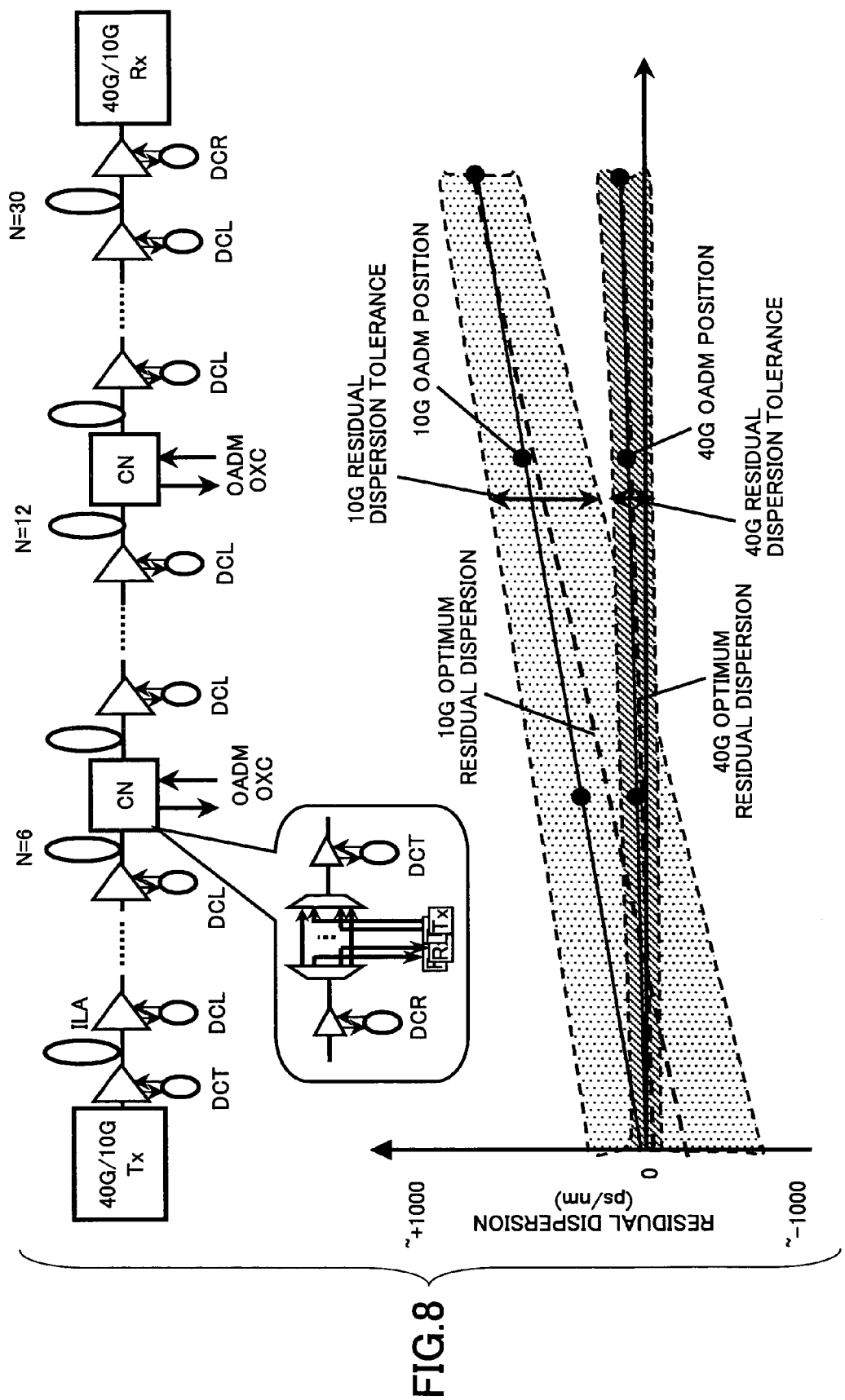
FIG. 8 shows a difference in a residual dispersion tolerance for different bit rates.

FIG. 8 shows a difference in a residual dispersion tolerance between respective bit rates of 10 Gbit/s and 40 Gbit/s. Due to optical fiber non-linear effect (SPM) in which a light propagation speed differs as optical power of the signal differs, the residual dispersion tolerance shifts positively as a transmission distance increases. However, a degree of shifting of the residual dispersion tolerance is smaller in a 40 Gbit/s system than that in a 10 Gbit/s system. As shown in FIG. 3A, optimum residual dispersion at 40 Gbit/s is approximately zero. Therefore, optimization of residual dispersion should be carried out individually for each bit rate at a compensation node (CN) in which an OADM or an OXC is carried out or at a receiving end.

Figure 3B:
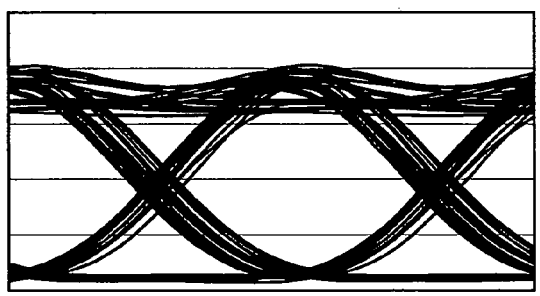
Figure 3C:
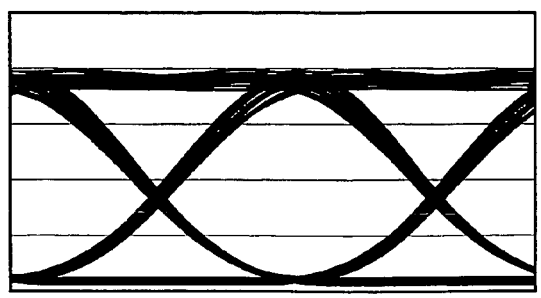
Figure 4:
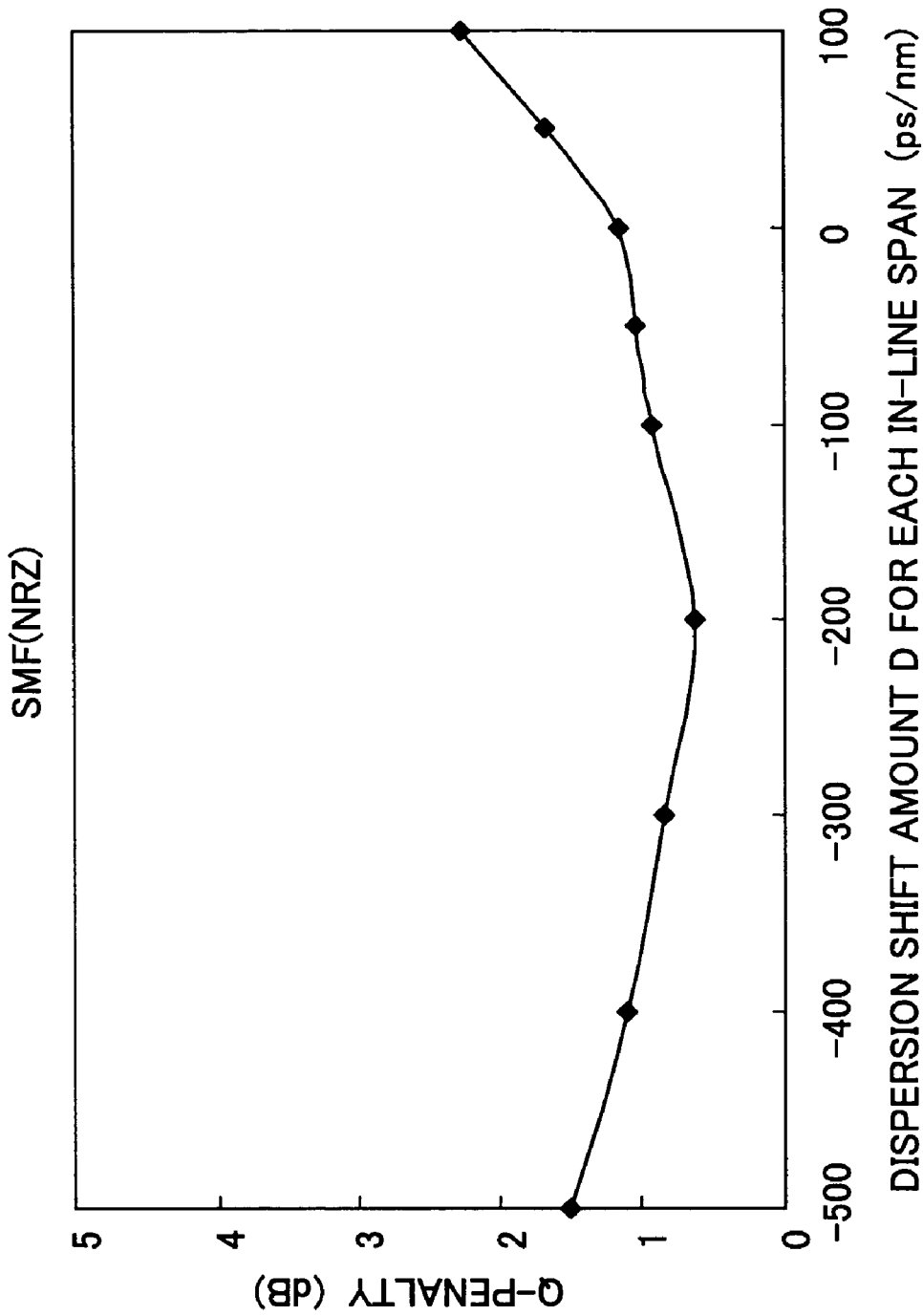
FIG. 4 shows Q penalty characteristics with respect to a dispersion deviation amount.
Figure 5:
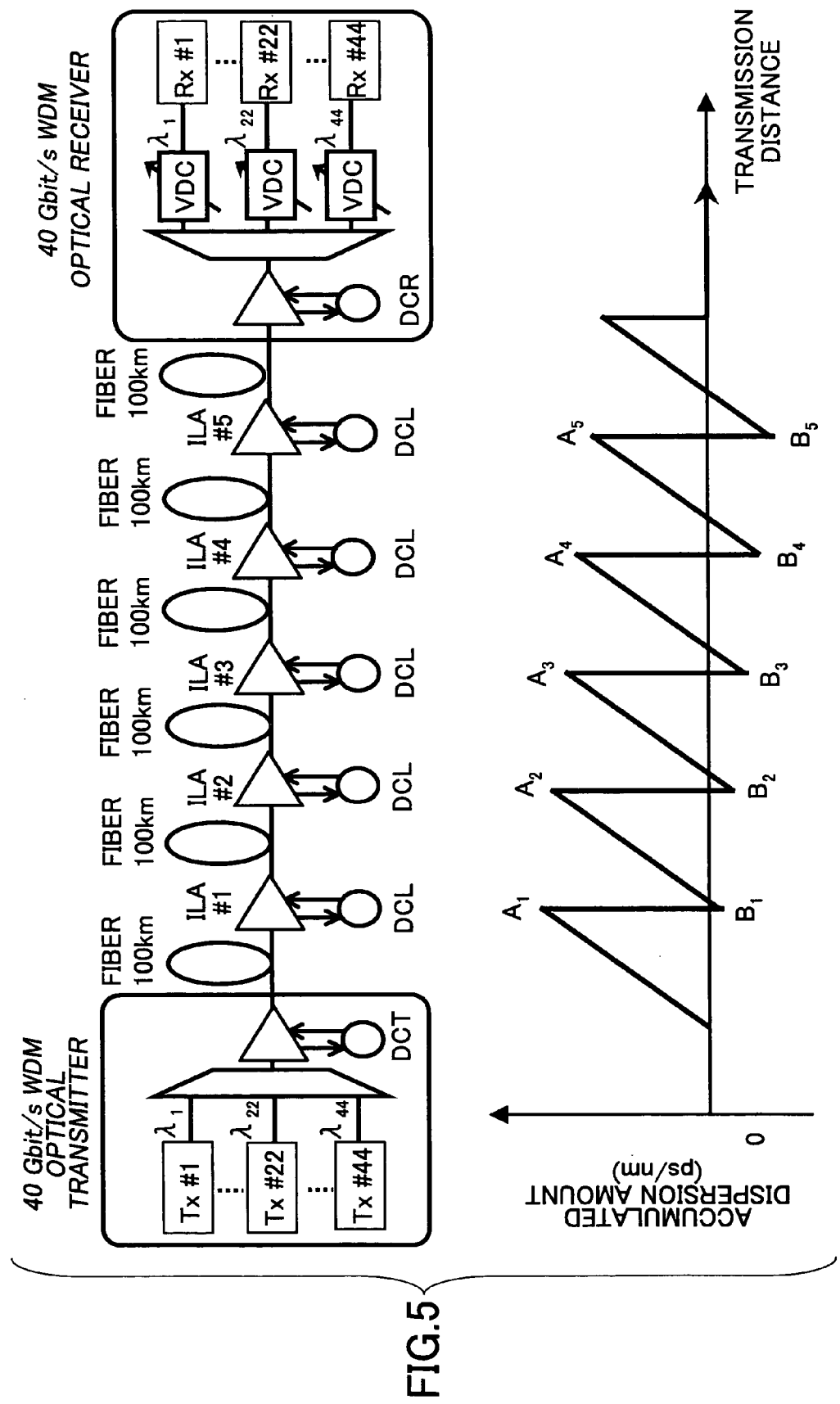
FIG. 5 shows an optimum dispersion map.
Figure 6A:
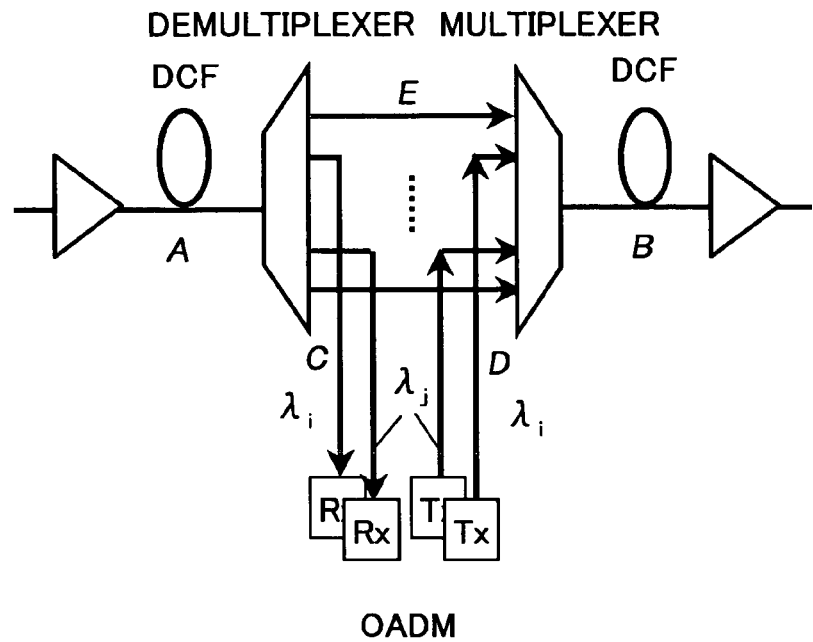
FIGS. 6A and 6B show optical add/drop multiplexing apparatus and an optical cross-connect apparatus.
Figure 6B:
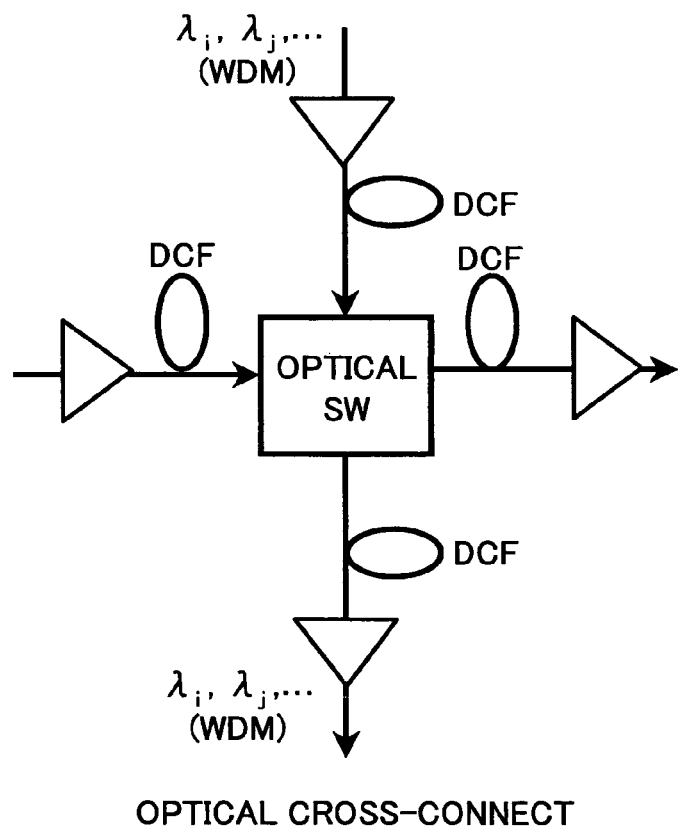
Figure 7:
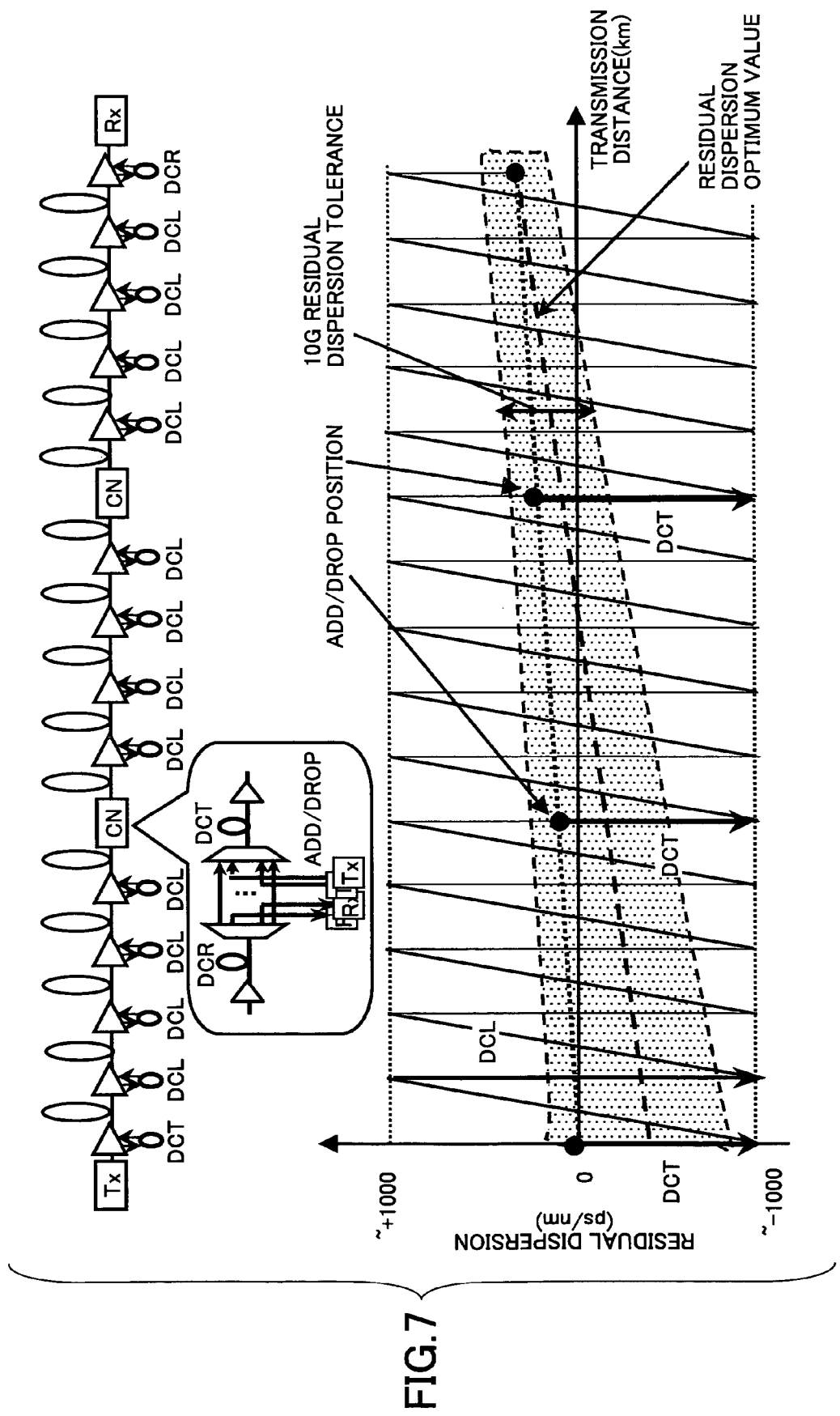
FIG. 7 shows a dispersion map in a case where an OADM in the related art is disposed.
Figure 9:
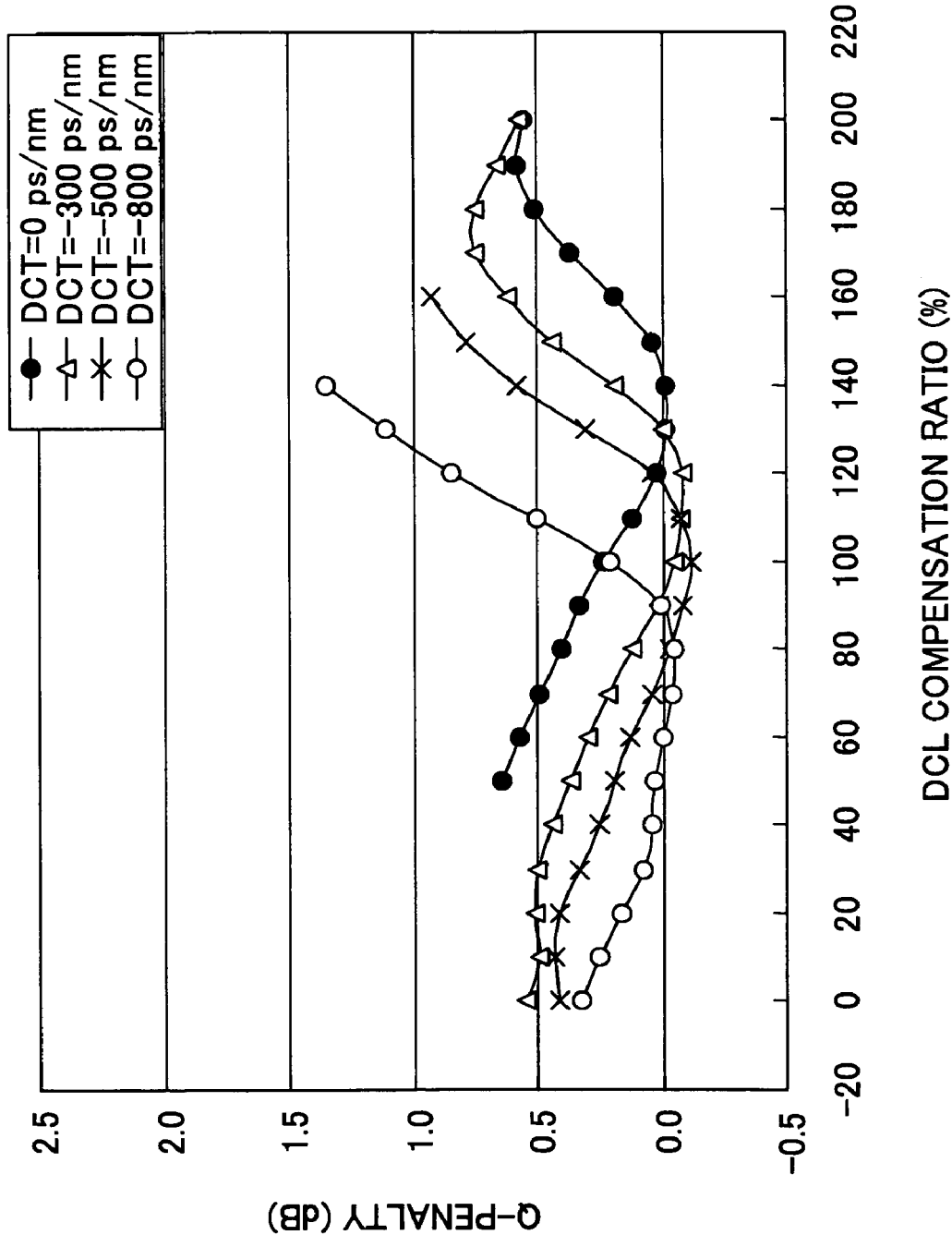
FIG. 9 shows a simulation result for dispersion compensation map optimization.

FIG. 9 shows a simulation result for optimization of a dispersion compensation map for 10 Gbit/s E-LEAF 1200 km transmission. Although a dispersion compensation at transmitter side amount is fixed as $D_{DCT}=0$ in FIG. 4, the dispersion compensation amount at transmitter side is changed as a parameter in this case, and thus, in-line dispersion compensation amount $D_{DCT}$ dependency is studied. As shown in FIGS. 3A through 3C, since an optimum residual dispersion amount at the receiving end does not much depend on a dispersion map in a middle of a transmission channel, the residual dispersion amount is fixed to an optimum point obtained from a calculation result for a certain dispersion map.

Further, a manner of disposing a DCF in a compensation node (CN) is such that, for the purpose of an OADM (apparatus) is disposed with residual dispersion in proportion to a transmission distance, DCFs are disposed separately at a pre-stage and a post stage (DCR & DCT). From FIG. 9, it is seen that an optimum in-line dispersion compensation amount $D_{DCL}$ (i.e., an in-line dispersion compensation amount having a minimum Q penalty) changes depending on a dispersion compensation amount at transmitter side $D_{DCT}$.

Figure 10A:
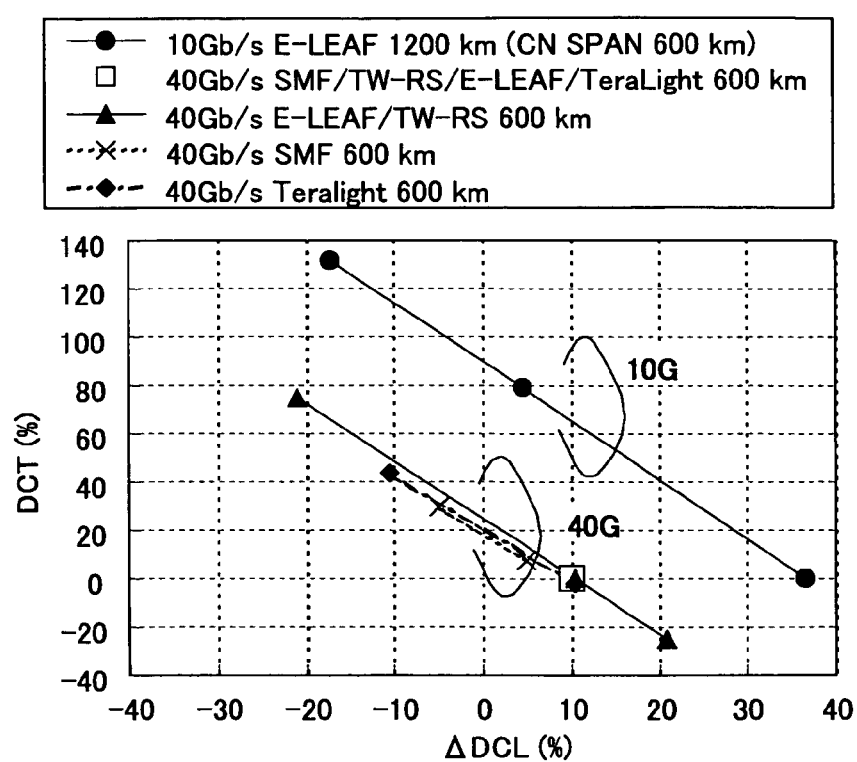
FIGS. 10A and 10B show combinations of optimum values of in-line dispersion compensation amounts DDCL and dispersion compensation amounts at transmitter side DDCT.
Figure 10B:
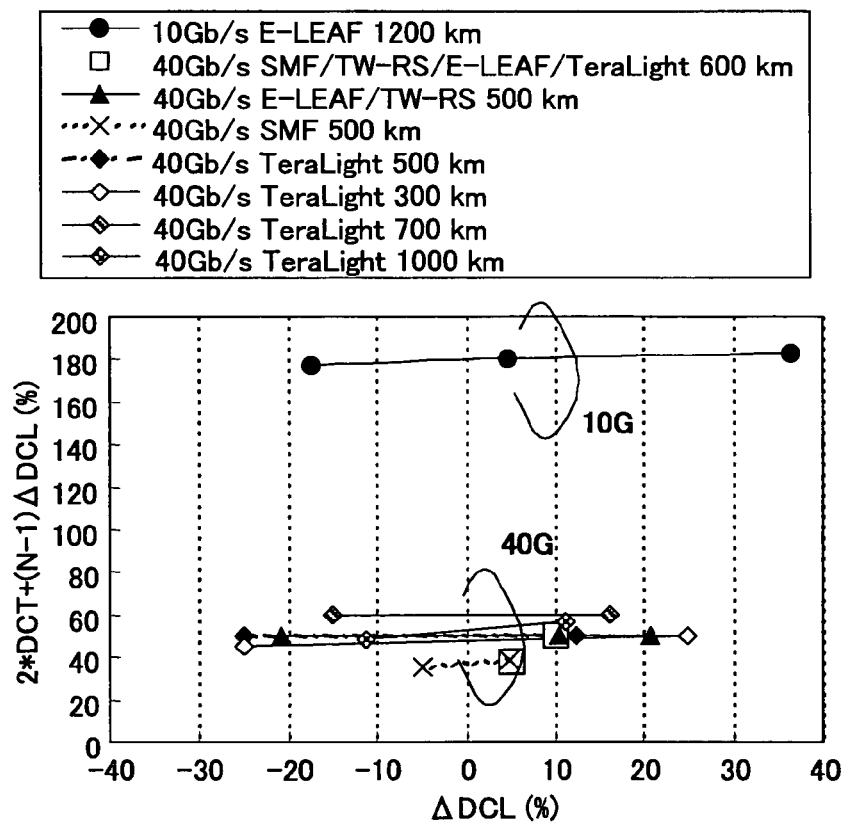

FIGS. 10A and 10B show calculation results of combinations of optimum values of in-line dispersion compensation amounts $D_{DCL}$ and dispersion compensation amounts at transmitter side $D_{DCT}$ (i.e., combinations of the in-line dispersion compensation amounts and the dispersion compensation amounts at transmitter side which result in the minimum Q penalties) for 10 Gbit/s and 40 Gbit/s. There, DCT and ΔDCL is not expressed in absolute values (in ps/nm) but expressed in ratios with respect to a channel dispersion for one span (in %). Thereby, it is seen therefrom that an optimum combination of DCT and ΔDCL changes while the following relationship is satisfied without regard to a channel type or the number of spans. In FIG. 10A, an abscissa denotes ΔDCL (a difference from 100% compensation) while an ordinate denotes DCT (%). Further, by setting a constant K obtained from the following formula (1) to a value suitable for each bit rate, this formula can be applied in common for each of 10 Gbit/s and 40 Gbit/s, as shown in FIG. 10B.

$$2\times DCT(\%)+(N-1)\times \Delta DCL(\%)=K(\%) \qquad (1)$$

There, N denotes the number of spans between the compensation nodes, DCT(%) denotes the transmitting end dispersion compensation ratio, and ΔDCL(%) denotes the in-line dispersion compensation residual ratio which is expressed by the following formula:

ΔDCL =(DCL −(1 span channel dispersion))/(1 span channel dispersion)=DCL (ps/nm)/(1 span channel dispersion)(ps/nm)−1

From FIG. 10B, it is seen that an order of K=50 results in an optimum combination of DCT and ΔDCL for 10 Gbit/s, while an order of K=180 results in an optimum combination of DCT and ΔDCL for 40 Gbit/s.

Figure 11:
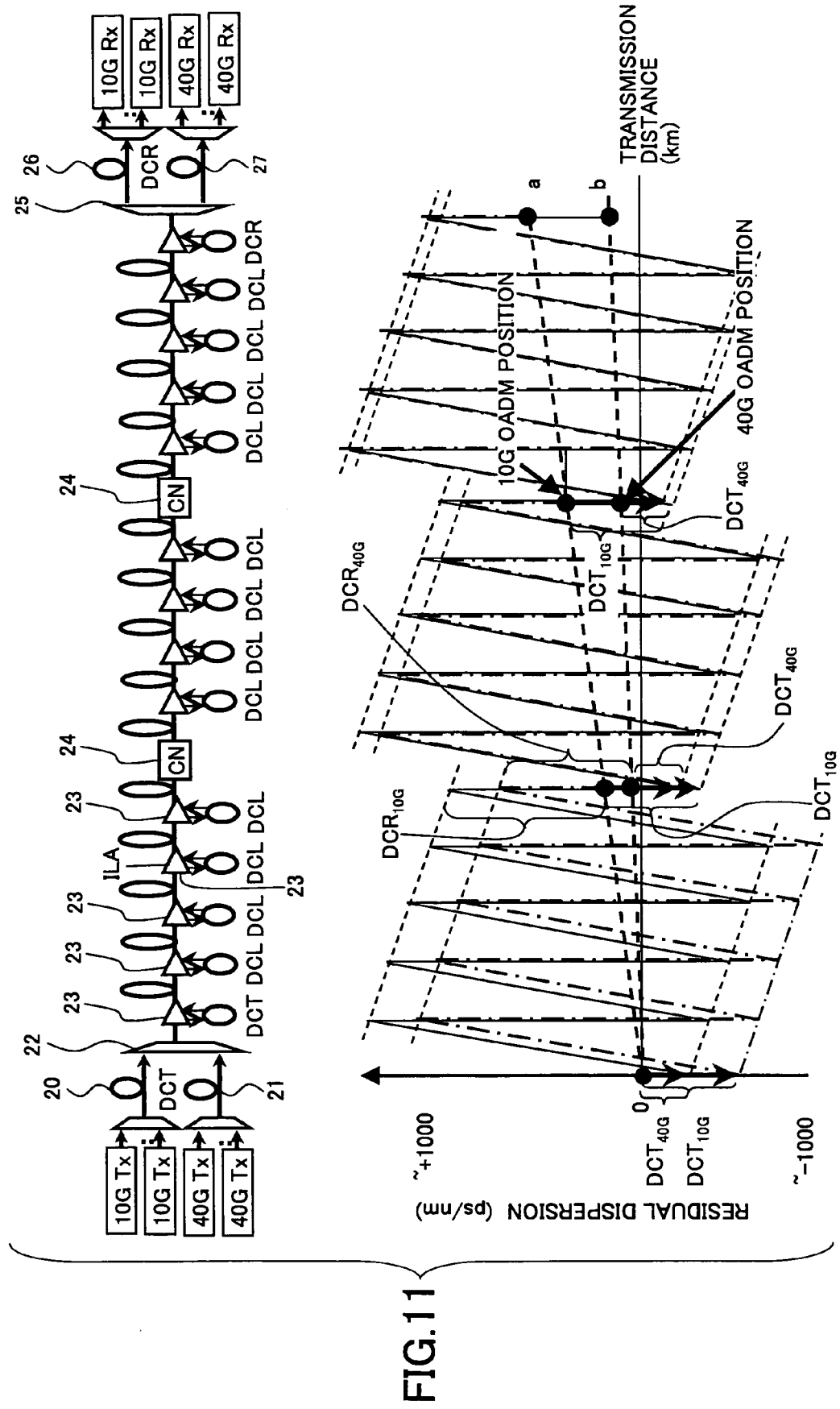
FIG. 11 shows one embodiment of a dispersion map in a dispersion compensation method according to the present invention.
Figure 12:
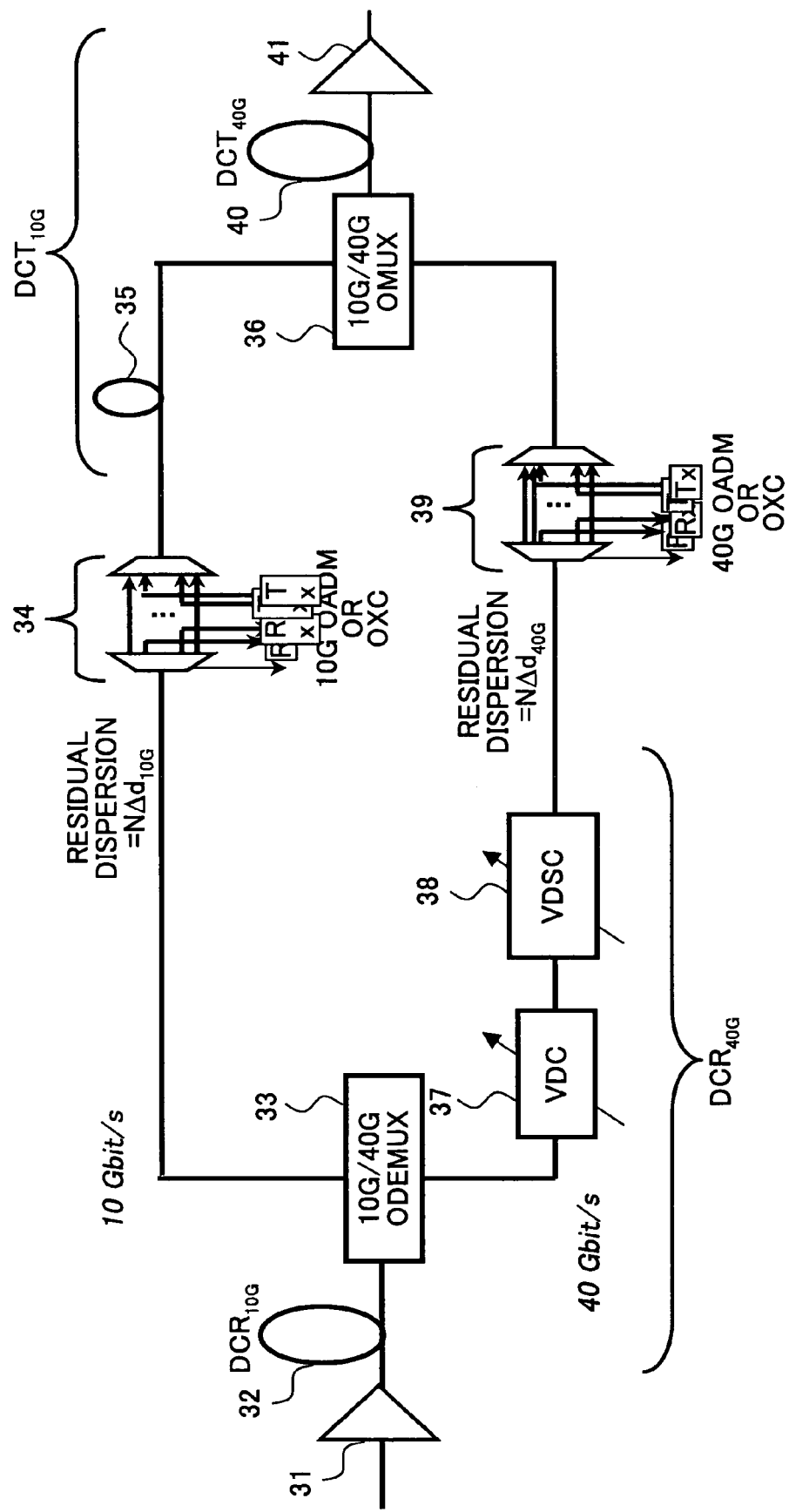
FIG. 12 shows a block diagram of a first embodiment of a compensation node apparatus according to the present invention.

FIG. 11 shows one embodiment of a dispersion map in a dispersion compensation method according to the present invention, and FIG. 12 shows a block diagram of a first embodiment of a compensation node according to the present invention.

Figure 13:
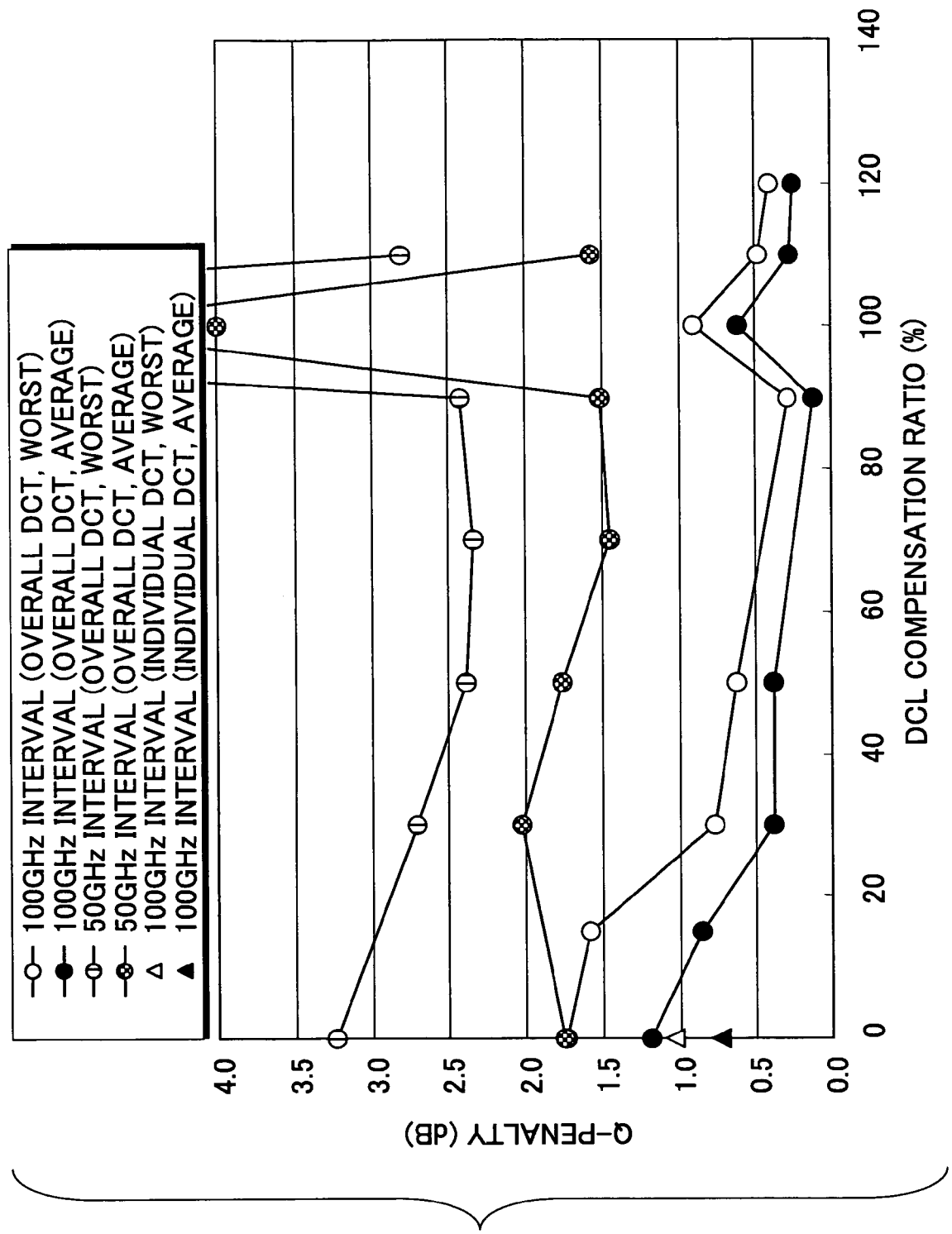
FIG. 13 shows waveform degradation due to cross-phase modulation.

First, according to the present invention, in order to minimize a size and costs of the entire system, a common dispersion compensator (DCL) is applied without distinguishing signals of respective bit rates of 10 Gbit/s and 40 Gbit/s in each of many in-line repeaters exiting. At this time, when setting is made such that ΔDCL=0 (i.e., DLC compensation ratio: 100%, or, complete compensation), bit sequences become coincident among adjacent channels for each in-line span. In such a case, as shown in FIG. 13, waveform degradation due to cross-phase modulation (XPM) in which a light propagation speed is affected by light power of adjacent channels may increase seriously. In order to avoid such a situation, complete compensation of ΔDCL=0 is avoided intentionally, and, instead, over-compensation of ΔDCL=10% or such (or, under-compensation of ΔDCL=−10% or such) is set.

As described above with reference to FIG. 8, residual dispersion should be set to have different values at an OADM part (or an OXC part) for 10 Gbit/s and 40 Gbit/s. Therefore, wavelength separation should be carried on in this part. After that, signal adding/dropping is carried out along broken lines 'a' and 'b' passing through the origin and having different slopes according to the respective bit rates shown in FIG. 11.

Specifically, as shown in FIG. 11, a dispersion compensation value $DCT_{10G}$ at a transmitting end (DCT) 20 for 10 Gbit/s and a dispersion compensation value $DCT_{40G}$ ($<DCT_{10G}$) at a transmitting end (DCT) 21 for 40 Gbit/s are set. It is noted that, in the dispersion map shown in FIG. 11, residual dispersion for 10 Gbit/s is indicated by a solid curve while residual dispersion for 40 Gbit/s is indicated by a dashed and dotted curve.

After that, a wavelength group of 10 Gbit/s and a wavelength group of 40 Gbit/s are multiplexed by means of an optical wavelength multiplexer 22, and then, are sent out to a transmission line. In the transmission line, for example, a compensation node (CN) 24 having a configuration shown in FIG. 12 is provided for each 6 spans of in-line repeaters 23, in which a configuration is provided such that dispersion compensation in a different manner is provided between 10 Gbit/s and 40 Gbit/s, as shown in FIG. 12.

At a receiving end, as shown in FIG. 11, an optical wavelength demultiplexer 25 demultiplexes the transmitted optical signal into the wavelength group of 10 Gbit/s and the wavelength group of 40 Gbit/s, and then, final dispersion compensation is carried out on the thus-obtained signals with a receiving end (DCR) 26 for 10 Gbit/s and a receiving end (DCR) 27 for 40 Gbit/s.

As shown in FIG. 12, in each compensation node 24, received light is amplified by an optical amplifier 31, is made to pass through a dispersion compensator 32 in which the above-mentioned dispersion compensation value $DCR_{10G}$ is set, and then, is provided to an optical wavelength demultiplexer 33. In the optical demultiplexer (ODEMUX) 33, separation of the signal is made into the wavelength group of 10 Gbit/s and the wavelength group of 40 Gbit/s.

The wavelength group of 10 Gbit/s provided by the optical demultiplexer 33 includes residual dispersion $N\Delta d_{10G}$, has signal adding/dropping carried out therefor in an OADM (or an OXC) 34, and then, is provided to an optical wavelength multiplexer (OMUX) 36 after passing through a dispersion compensator 35. There, N denotes the number of spans, $\Delta d_{10G}$ denotes residual dispersion setting amount for a 10 Gbit/s signal for one span.

On the other hand, the wavelength group of 40 Gbit/s provided by the optical demultiplexer 33 is made to pass through a variable dispersion compensator (VDC) 37 and a variable dispersion slope compensator (VDSC) 38, and after that, is provided to an OADM (or OXC) 39 in a state of including residual dispersion $N\Delta d_{40G}$. In the OADM (or the OXC) 39, signal adding/dropping is carried out therefor, and then, the thus-obtained signal is provided to the optical wavelength multiplexer (OMUX) 36. There, $\Delta d_{40G}$ denotes residual dispersion setting amount for a 40 Gbit/s signal for one span.

The optical multiplexer 36 multiplexes the wavelength group of 10 Gbit/s and the wavelength group of 40 Gbit/s thus provided thereto. An optical signal output by the optical multiplexer 36 is then made to pass through a dispersion compensator 40 in which a dispersion compensation value $DCT_{40G}$ for 40 Gbit/s is set, is amplified by an optical amplifier 41, and is output from the compensation node 24.

Respective dispersion compensation values of the dispersion compensator 32, the variable dispersion compensator 37 and the variable dispersion slope compensator 38 are set such that a total thereof may be the desired dispersion compensation value $DCR_{40G}$ for 40 Gbit/s. On the other hand, respective dispersion compensation values of the dispersion compensator 35 and the dispersion compensator 40 are set such that a total thereof may be the desired dispersion compensation value $DCR_{10G}$ for 10 Gbit/s, as shown in FIG. 12. Accordingly, for the signal of 10 Gbit/s, the dispersion compensation value $DCR_{10G}$ and the dispersion compensation amount $DCT_{10G}$ are given, while for the signal of 40 Gbit/s, the dispersion compensation value $DCR_{40G}$ and the dispersion compensation amount $DCT_{40G}$ are given, in the compensation node 25 having the configuration shown in FIG. 12. Each of a sum of the above-mentioned dispersion compensation values $DCR_{10G}$ and $DCT_{10G}$ and a sum of the above-mentioned dispersion compensation values $DCR_{40G}$ and $DCT_{40G}$ is set based on the above-mentioned formula (1).

Each of the dispersion compensation value $DCR_{10G}$ and the dispersion compensation value $DCT_{10G}$ is set in a value in proportion to the relevant number of repeating spans counted from the transmitting end with respect to a reference value which is the optimum residual dispersion amount for the maximum transmission distance for the relevant bit rate. In other words, setting is made so that the set values coincide with a broken line 'a' in FIG. 11. As a result, each wavelength of a 10 Gbit/s signal can have signal adding/dropping carried out therefor on the broken line 'a'. Similarly, each of the dispersion compensation value $DCR_{40G}$ and the dispersion compensation value $DCT_{40G}$ is set in a value in proportion to the relevant number of repeating spans counted from the transmitting end with respect to a reference value which is the optimum residual dispersion amount for the maximum transmission distance for the relevant bit rate. In other words, setting is made so that the set values coincide with the broken line 'b' in FIG. 11. As a result, each wavelength of a 40 Gbit/s signal can have signal adding/dropping carried out therefor on the broken line 'b'. Thus, it is not necessary to provide a dispersion compensator for each channel for which signal adding/dropping is carried out, and thus, the costs and the size of the system can be effectively reduced.

Since the dispersion tolerance is strict for 40 Gbit/s, the variable dispersion compensator 37 is employed. However, instead, a fixed dispersion compensator may be employed. The variable dispersion slope compensator 38 is provided only for 40 Gbit/s transmission since strict dispersion slope compensation is required as the bit rate increases. However, it is possible to replace it with a fixed dispersion slope compensator, or it is also possible to omit the same since it is not necessarily required. Furthermore, it is possible to provide a configuration in which, in a pre-stage of the optical wavelength demultiplexer 33, a variable dispersion slop compensator is provided, whereby dispersion slope compensation is carried out also for the 10 Gbit/s wavelength group.

Figure 14:
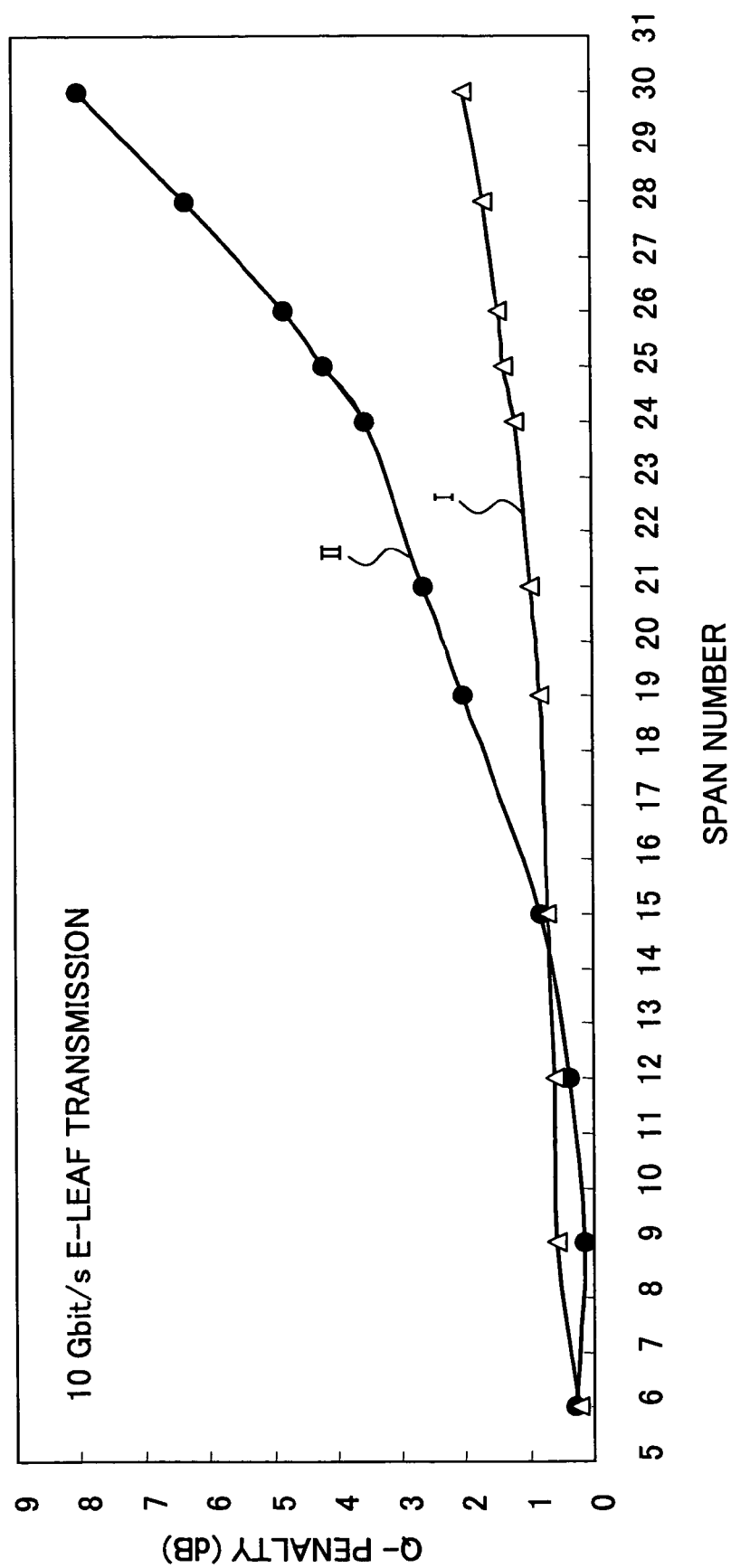
FIG. 14 shows a calculation result of transmission characteristic improvement for 10 Gbit/s transmission.

FIG. 14 shows a calculation result of transmission characteristic improvement for 10 Gbit/s transmission. A solid curve I denotes Q penalty characteristics for in-line repeater over-compensation (110% compensation) while a solid curve II denotes Q penalty characteristics for in-line repeater compensation (100% compensation). Therefrom, it is seen that, thanks to the above-mentioned prevention of cross-phase modulation (XPM) by means of in-line over-compensation (110% compensation), the improvement effect is large especially for long distance transmission.

Next, another embodiment which is applied in a situation in which a 10 Gbit/s transmission system is switched into a 40 Gbit/s transmission system is described. When the bit-rate switching from the 10 Gbit/s transmission system into the 40 Gbit/s transmission system is carried out, it is necessary to also switch a manner of dispersion compensation for the 10 Gbit/s transmission system into a manner of dispersion compensation for the 40 Gbit/s transmission system so as to achieve proper dispersion compensation whether the 10 Gbit/s transmission system or the 40 Gbit/s transmission system is actually applied.

Figure 15:
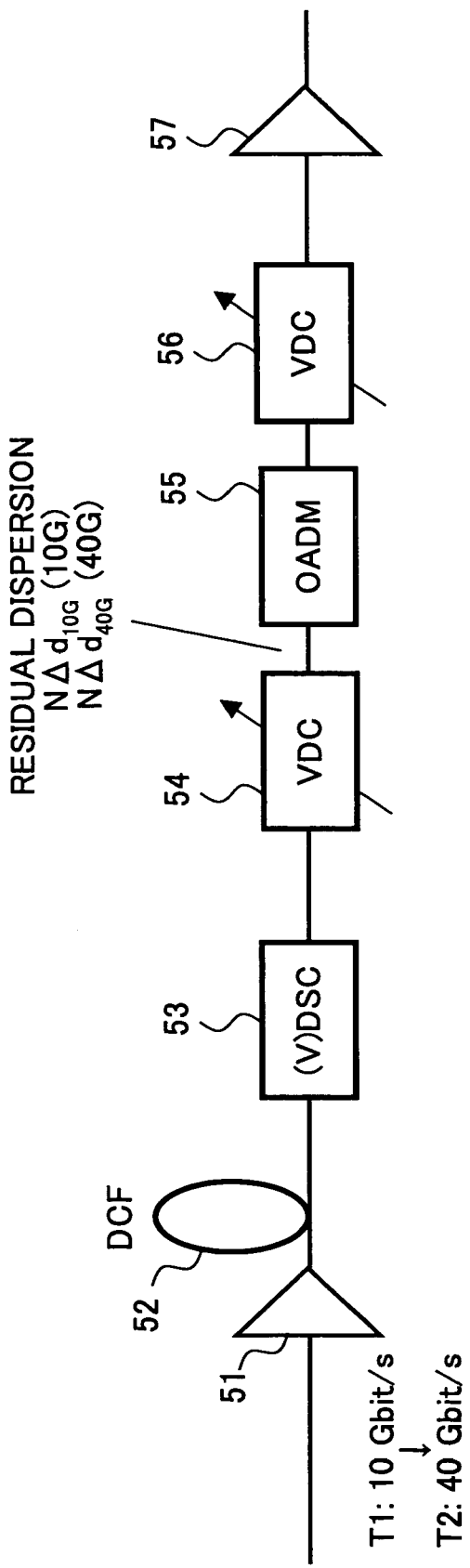
FIG. 15 shows a block diagram of a second embodiment of a compensation node apparatus which switches a dispersion compensation value for a 10 Gbit/s transmission system into the same for a 40 Gbit/s transmission system according to the present invention.

FIG. 15 shows a block diagram of a second embodiment of a compensation node according to the present invention which is used when a 10 Gbit/s transmission system is switched into a 40 Gbit/s transmission system. In the figure, received light is amplified by an optical amplifier 51, is made to pass through a dispersion compensator 52 in which a require dispersion compensation value $DCR_{10G}$ for 10 Gbit/s is set, and is provided to a variable dispersion slope compensator 53. There, dispersion compensation is carried out on the received light. An optical signal output from the variable dispersion slope compensator 53 is provided to a variable dispersion compensator 54 in a state of having residual dispersion $N\Delta d_{10G}$. When the bit-rate switching is made from the 10 Gbit/s transmission system into the 40 Gbit/s transmission system as mentioned above, the variable dispersion compensator 54 switches its dispersion compensation value 0 for the 10 Gbit/s transmission system into a dispersion compensation value ($DCR_{40G}$–$DCR_{10G}$) for the 40 Gbit/s transmission system.

The signal light output from the variable dispersion compensator 54 has a state having the residual dispersion $N\Delta d_{10G}$ for the 10 Gbit/s transmission system but has a residual dispersion $N\Delta d_{40G}$ for the 40 Gbit/s transmission system after the above-mentioned bit-rate switching into the 40 Gbit/s transmission system is carried out, is then provided to an OADM (or OXC) 55, in which the optical signal has signal adding/dropping carried out therefor. After that, the optical signal is provided to a variable dispersion compensator 56. The variable dispersion compensator 56 sets a dispersion compensation value of $DCT_{10G}$ for the 10 Gbit/s transmission system, and switches it into a dispersion compensation value $DCT_{40G}$ for the 40 Gbit/s transmission system when the above-mentioned bit-rate switching into the 40 Gbit/s transmission system is carried out.

The variable dispersion slope compensator 53 carries out dispersion slope compensation in a manner optimum to each of the 10 Gbit/s transmission and the 40 Gbit/s transmission. However, this device should not necessarily be provided.

Figure 16:
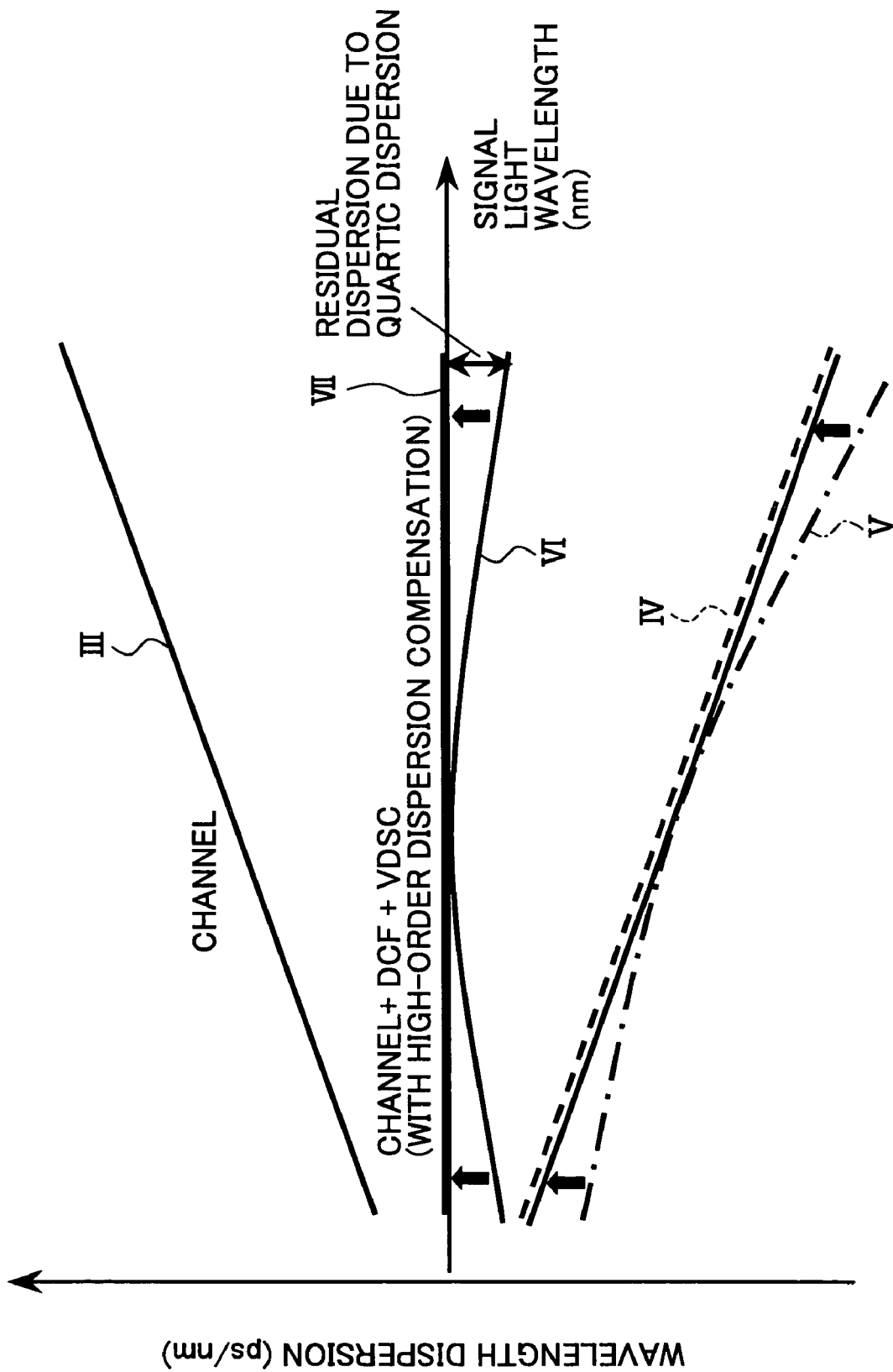
FIG. 16 illustrates compensation from high-order dispersion (quartic dispersion)

In signal transmission for a very long distance at 10 Gbit/s or 40 Gbit/s, further high-order dispersion (quartic dispersion) may become a serious problem. As shown in FIG. 16, when dispersion compensation of a solid curve IV is carried out for the purpose of dispersion compensation from expected channel dispersion of a solid curve III for example, since actual dispersion is such as that shown in a dashed and dotted curve V due to high-order dispersion (quartic dispersion), residual dispersion of a solid curve VI still remains even after the above-mentioned dispersion compensation. In order to solve such a problem, the variable dispersion slope compensator 38 or 53, or the variable dispersion compensator 37 or 54, mentioned above, is preferably configured to have a function of compensating from such quartic dispersion. Thereby, it is possible to achieve optimum dispersion compensation such that residual dispersion may be made to be zero throughout the entire wavelength range as indicated by a solid curve VII.

Figure 17:
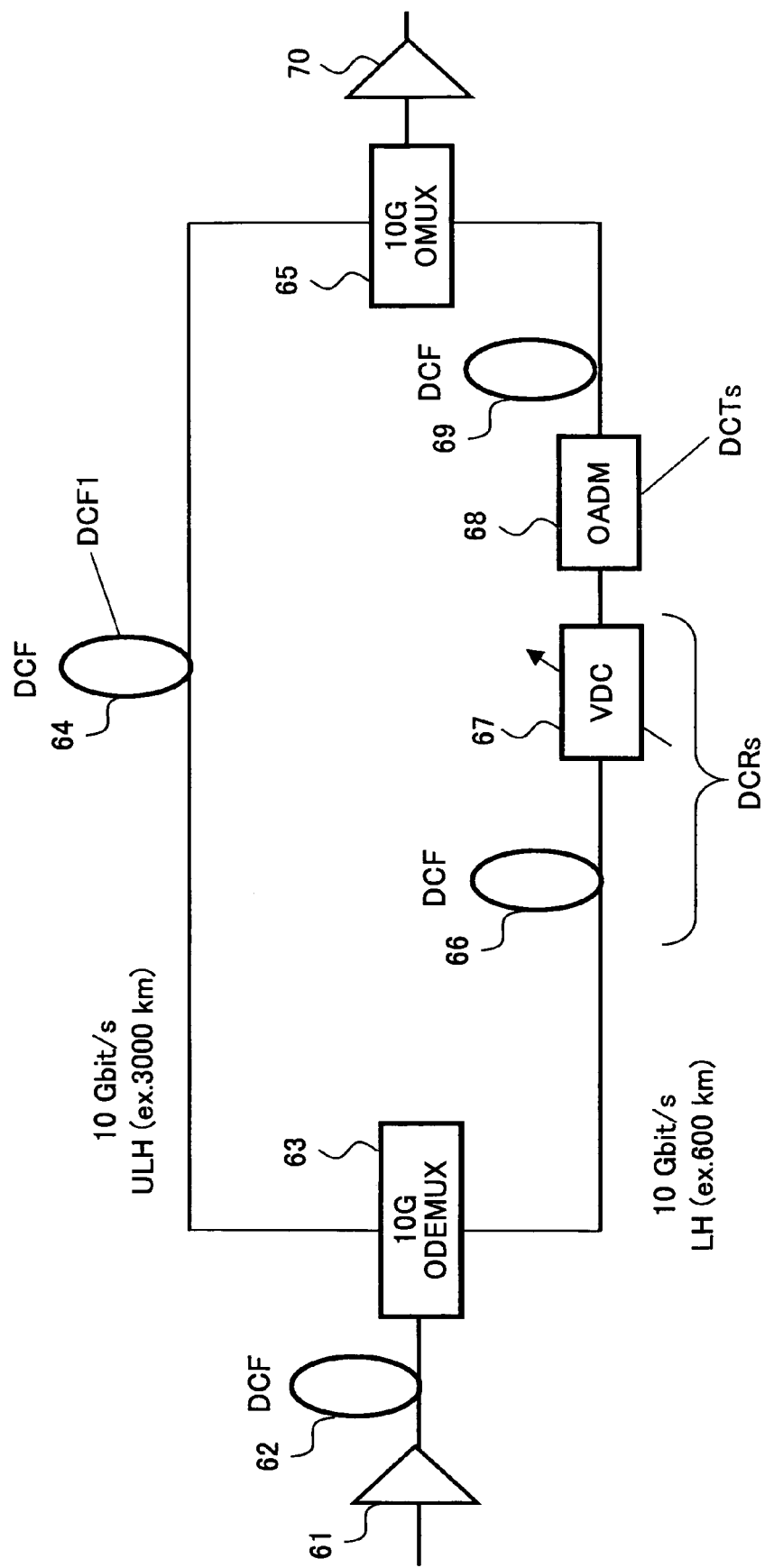
FIG. 17 shows a third embodiment of a compensation node apparatus in a case where signals having different transmission distances are multiplexed according to the present invention.

FIG. 17 shows a third embodiment of a compensation node according to the present invention which handles a light signal in which signals having a common bit rate but different transmission distances are multiplexed. In this configuration shown in FIG. 17, received light of 10 Gbit/s is amplified by an optical amplifier 61, and, then, is provided to an optical wavelength demultiplexer 63 after being made to pass through a dispersion compensator 62. The optical wavelength demultiplexer 63 separates the received light into a wavelength group of very long distance transmission on the order of 3000 km and a wavelength group of short distance transmission on the order of 600 km. The wavelength group of the very long distance transmission output from the optical wavelength demultiplexer 63 is provided to an optical wavelength multiplexer 65 after being made to pass through a dispersion compensator 64.

The wavelength group of the short long distance transmission output from the optical wavelength demultiplexer 63 is provided to an OADM (or OXC) 68 after being made to pass through a dispersion compensator 66 and a variable dispersion compensator (VDC) 67. Then, after signal adding/dropping is carried out in the OADM (or OXC) 68, the wavelength group of the short distance transmission is provided to the optical wavelength multiplexer 65. The optical wavelength multiplexer 65 multiplexes the wavelength group of the very long distance transmission and the wavelength group of the short distance transmission. An optical signal output from the optical wavelength multiplexer 65 is amplified by an optical amplifier 70, and then, is output from the compensation node.

Figure 18:
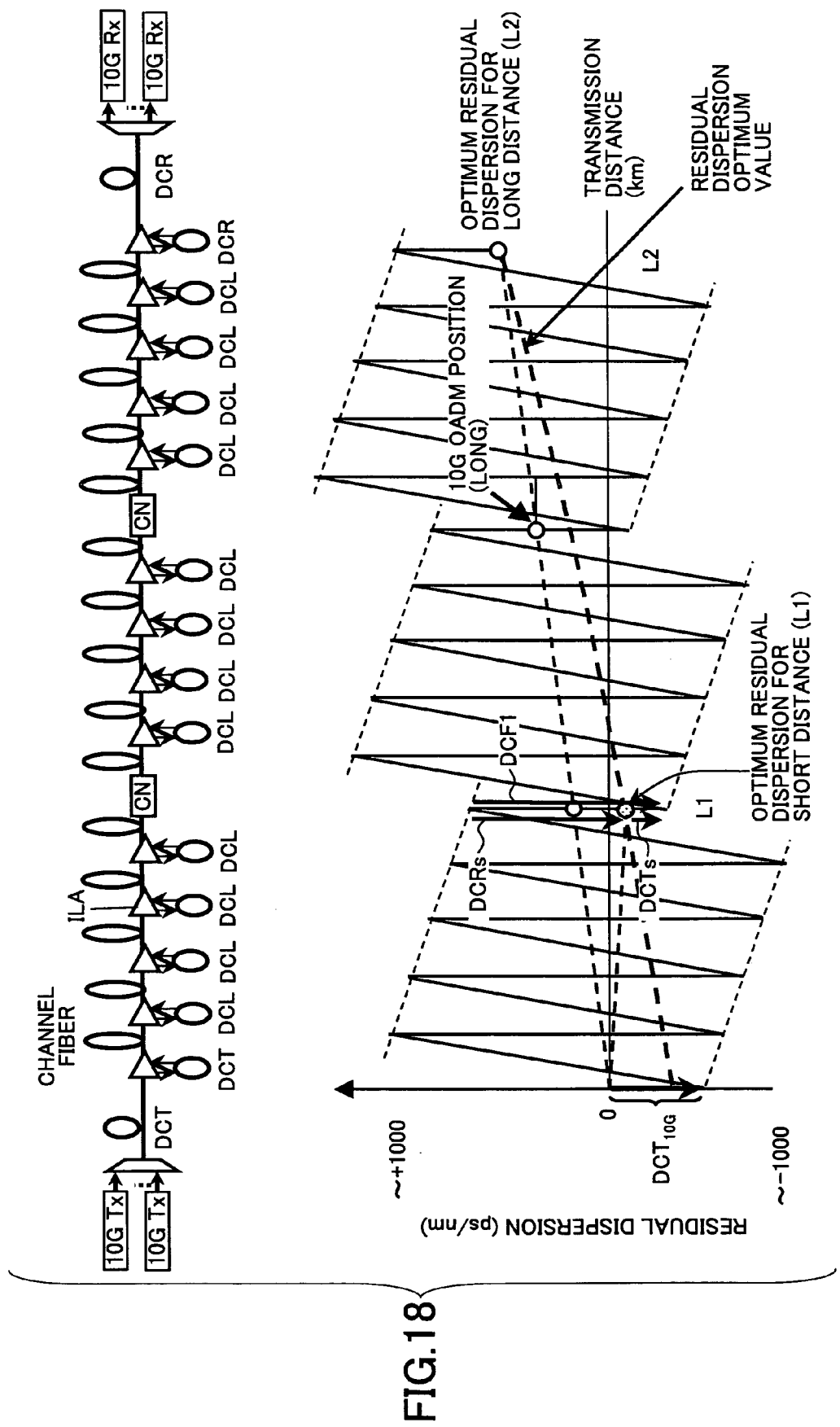
FIG. 18 shows a dispersion map in a case where signals having different transmission distances are multiplexed.

As shown in FIG. 18, optimum residual dispersion changes to a positive side as a transmission distance increases. In the figure, DCRs denotes a total dispersion compensation value given by the dispersion compensator 66 and the variable dispersion compensator 67, DCTs denotes a dispersion compensation value given by the dispersion compensator 69 and DCF1 denotes a dispersion compensation value given by the dispersion compensator 64.

In the compensation node shown in FIG. 17, the wavelength group of the very long distance transmission is made to bypass the OADM 68, and only the wavelength group of the short distance transmission is made to pass through the OADM 68. In the configuration of FIG. 17, it is possible to carry out optimization of the dispersion compensation value, individually, for the wavelength group of the very long distance transmission and for the wavelength group of the short distance transmission.

The dispersion compensator 66 and the variable dispersion compensator 67 or the dispersion compensator 62 may be omitted. Further, although the compensation node shown in FIG. 17 is configured not to carry out signal adding/dropping for the wavelength group of the very long distance transmission and cause it to bypass the OADM 67, it is also possible to configure the compensation node to also carry out signal adding/dropping for the wavelength group of the very long distance transmission.

The above-mentioned optical wavelength demultiplexer 33 acts as a wavelength demultiplexing part claimed, the dispersion compensators 32, 35 or 40 or the variable dispersion compensator 37 acts as a per-bit-rate dispersion compensation part claimed, the optical wavelength multiplexer 36 acts as a wavelength multiplexer claimed, the dispersion compensator 32 or 40 acts as a first dispersion compensation part claimed, the variable dispersion compensator 37 acts as a second dispersion compensation part claimed, the variable dispersion slope compensator 38 or 53 acts as a dispersion slope compensation part claimed and the variable dispersion compensator 54 or 56 acts as a variable dispersion compensation part claimed.

Further, the present invention is not limited to the above-described embodiments, and variations and modifications may be made without departing from the basic concept of the present invention claimed below.

The present application is based on Japanese Priority Patent Application No. 2004-105976, filed on Mar. 31, 2004, the entire contents of which are hereby incorporated herein by reference.

What is claimed is:

1. A dispersion compensation method compensating for chromatic dispersion occurring in a channel transmitting therein a signal in which optical signals having different bit rates are wavelength-multiplexed, comprising:

providing a compensation node for each predetermined number of in-line repeaters of a plurality of predetermined numbers of in-line repeaters;

carrying out dispersion compensation in common for the different bit rates in the in-line repeaters;

carrying out wavelength demultiplexing on the optical signals for the respective different bit rates in the compensation node provided for each predetermined number of in-line repeaters;

performing per-bit-rate dispersion compensating of the optical signals for setting an optimum dispersion compensation value for the optical signal at each bit rate and carrying out dispersion compensation for each bit rate;

carrying out wavelength multiplexing of the optical signals each having undergone the dispersion compensation by means of the per-bit-rate dispersion compensating; and carrying out optical adding/dropping or optical cross-connect for each of different bit rates, wherein:

the setting sets an optimum residual dispersion amount for each bit rate at a reproduction repeating span when the optical adding/dropping or optical cross-connect is carried out for each of the different bit rates to a value in proportion to the number of repeater spans from a transmission end with respect to an optimum residual dispersion reference amount for a maximum transmission distance at the corresponding bit rate.

2. The dispersion compensation method as claimed in claim 1, wherein:

the optimum dispersion compensation value for each in-line repeater between the compensation nodes is set in such a manner that over compensation or under compensation is carried out with respect to a chromatic dispersion amount between the in-line repeaters.

3. The dispersion compensation method as claimed in claim 2, wherein:

the optimum dispersion compensation value is determined for each bit rate at each one of a transmitting end and the compensation node in a reproduction repeating span, based on a formula having a value different according to the bit rate, with respect to a dispersion compensation value for the in-line repeaters.

4. A compensation node, provided for each predetermined number of in-line repeaters of a plurality of predetermined numbers of in-line repeaters, compensating for chromatic dispersion occurring in a channel transmitting therein a signal in which optical signals having different bit rates are wavelength-multiplexed, comprising:

a wavelength demultiplexer arranged to carry out wavelength demultiplexing on the optical signals for the respective different bit rates;

a per-bit-rate dispersion compensator arranged to set an optimum dispersion compensation value for the optical signal at each bit rate and carrying out dispersion compensation for each bit rate;

a wavelength multiplexer arranged to carry out wavelength multiplexing of the optical signals each having undergone the dispersion compensation by means of the per-bit-rate dispersion compensator; and an optical processor arranged to carry out optical adding/dropping or optical cross-connect for each of different bit rates, wherein:

the per-bit-rate dispersion compensator sets an optimum residual dispersion amount for each bit rate at a reproduction repeating span when the optical processor carries out optical adding/droppinq or optical cross-connect for each of the different bit rates to a value in proportion to the number of repeater spans from a transmission end with respect to an optimum residual dispersion reference amount for a maximum transmission distance at the corresponding bit rate.

5. The compensation node as claimed in claim 4, wherein:

the per-bit-rate dispersion compensator comprises dispersion compensators disposed before and after the optical processor and arranged to set optimum residual dispersion amounts.

6. The compensation node as claimed in claim 5, wherein:

the per-bit-rate dispersion compensator comprises a first dispersion compensator arranged to provide an optimum dispersion compensation value for a low bit rate optical signal in common for all the bit rates, while the per-bit-rate dispersion compensator further comprises a second dispersion compensator arranged to correct the optimum dispersion compensation value for the low bit rate optical signal to an optimum dispersion compensation value for a high bit rate optical signal.

7. The compensation node as claimed in claim 6, comprising a dispersion slope compensator arranged to carry out dispersion slope compensation on the high bit rate optical signal.

8. The compensation node as claimed in claim 7, wherein:

the dispersion slope compensator is arranged to compensate for quartic dispersion having a higher order than that of a dispersion slope.

* * * * *

UNITED STATES PATENT AND TRADEMARK OFFICE
CERTIFICATE OF CORRECTION

PATENT NO. : 7,885,545 B2  
APPLICATION NO. : 10/971735  
DATED : February 8, 2011  
INVENTOR(S) : Hiroki Ooi et al.

Page 1 of 1

It is certified that error appears in the above-identified patent and that said Letters Patent is hereby corrected as shown below:

Column 12, Line 15, In Claim 4, delete "droppinq" and insert --dropping--, therefor.

Signed and Sealed this
Thirteenth Day of September, 2011

David J. Kappos
*Director of the United States Patent and Trademark Office*